(12) United States Patent
Guezelarslan et al.

(10) Patent No.: US 11,551,116 B2
(45) Date of Patent: Jan. 10, 2023

(54) SIGNAL ANALYSIS METHOD AND SIGNAL ANALYSIS MODULE

(71) Applicant: Rohde & Schwarz GmbH & Co. KG, Munich (DE)

(72) Inventors: Baris Guezelarslan, Munich (DE); Dominik Hettich, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 430 days.

(21) Appl. No.: 16/776,335

(22) Filed: Jan. 29, 2020

(65) Prior Publication Data

US 2021/0232945 A1 Jul. 29, 2021

(51) Int. Cl.
*G06F 21/00* (2013.01)
*G06N 5/04* (2006.01)
*G06N 20/00* (2019.01)
*G06F 17/14* (2006.01)

(52) U.S. Cl.
CPC ............... *G06N 5/04* (2013.01); *G06F 17/14* (2013.01); *G06N 20/00* (2019.01)

(58) Field of Classification Search
CPC ........ G06N 5/04; G06N 20/00; G06N 3/0454; G06N 3/08; G06F 17/14
See application file for complete search history.

(56) References Cited

U.S. PATENT DOCUMENTS

| | | | | |
|---|---|---|---|---|
| 8,150,151 B2* | 4/2012 | Gori | ........................... | G06T 9/20 |
| | | | | 382/156 |
| 9,048,902 B2* | 6/2015 | Robert | ................ | H04L 27/2626 |
| 10,558,207 B1* | 2/2020 | McGuirk | ............ | G05B 23/0283 |
| 10,579,932 B1* | 3/2020 | Cantrell | ............ | G06F 16/24568 |
| 2014/0079244 A1* | 3/2014 | Vrazic | ................. | H04L 25/0222 |
| | | | | 381/94.1 |
| 2015/0287422 A1* | 10/2015 | Short | ........................ | G01S 3/74 |
| | | | | 704/211 |
| 2019/0379589 A1* | 12/2019 | Ryan | ..................... | G06N 3/0454 |
| 2020/0225655 A1* | 7/2020 | Cella | ..................... | H04N 19/172 |
| 2022/0163947 A1* | 5/2022 | Michan | .............. | G05B 19/4185 |

FOREIGN PATENT DOCUMENTS

| | | | | | |
|---|---|---|---|---|---|
| CN | 108711436 A | * | 10/2018 | ............. | G06F 21/32 |
| CN | 109343060 A | | 2/2019 | | |
| CN | 109584888 A | * | 4/2019 | | |
| CN | 110136745 A | * | 8/2019 | ........... | G06N 3/0454 |
| CN | 111007316 A | * | 4/2020 | ............. | G01R 23/16 |
| CN | 111222088 A | * | 6/2020 | ........... | G06F 17/142 |
| CN | 109374977 B | * | 2/2021 | ........... | G01R 27/205 |
| CN | 112929622 A | * | 6/2021 | ............. | H04N 9/646 |

* cited by examiner

*Primary Examiner* — Don G Zhao
(74) *Attorney, Agent, or Firm* — Christensen O'Connor Johnson Kindness PLLC

(57) ABSTRACT

A signal analysis method is described. The signal analysis method comprises the following steps: An input signal function associated with a time domain is obtained. A window function is determined based on the input signal function via an artificial intelligence module. The artificial intelligence module comprises at least one computing parameter, wherein the window function is determined based on the at least one computing parameter. The input signal function and the window function are convolved, thereby generating a convolved signal. Further, a signal analysis module is described.

18 Claims, 6 Drawing Sheets

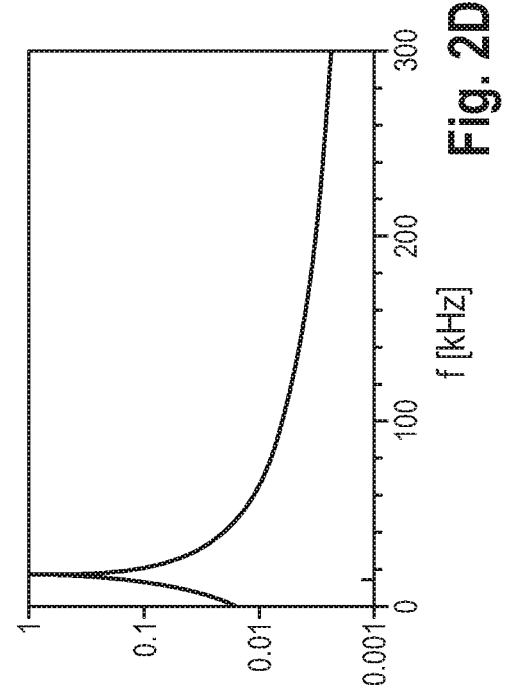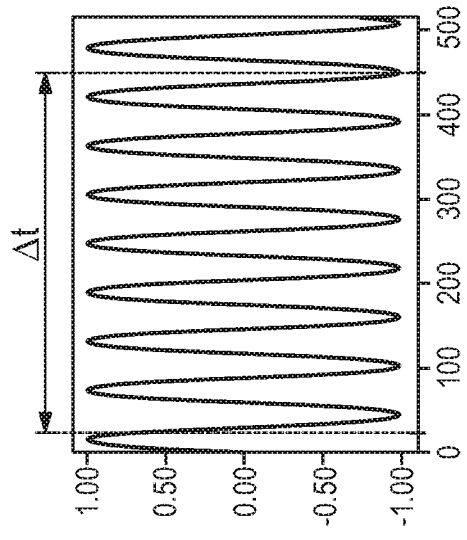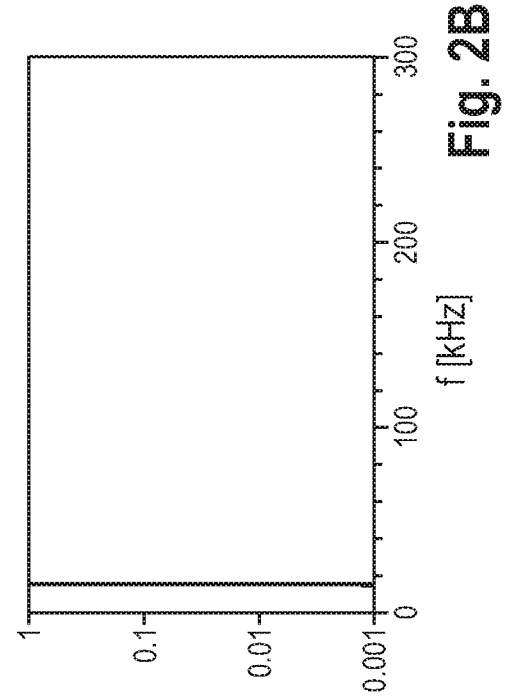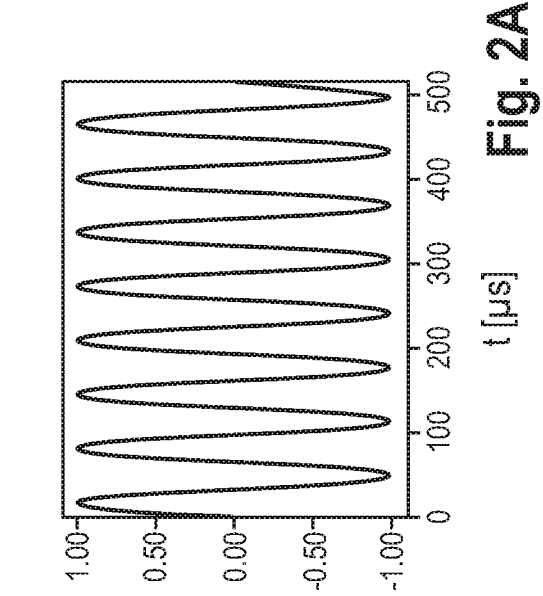

SIGNAL ANALYSIS METHOD AND SIGNAL ANALYSIS MODULE

FIELD OF THE DISCLOSURE

Embodiments of the present disclosure relate generally to a signal analysis method. Embodiments of the present disclosure further relate to a signal analysis module.

BACKGROUND

Several different types of signal analysis are done in frequency domain. Accordingly, a signal that is measured over a certain measurement time interval in time domain needs to be transformed to frequency domain for these types of analysis.

However, the corresponding transformation usually assumes that the measured signal is periodic within the measurement time interval. This assumption usually is only approximately true, and deviations of the real signal from that assumption cause a phenomenon known as "leakage", i.e. a broadening of the signal spectrum and the emergence of side bands.

Accordingly, there is a need for a signal analysis method as well as a signal analysis module that allow for analyzing a signal in frequency domain with reduced leakage effects.

SUMMARY

Embodiments of the present disclosure provide a signal analysis method. In an embodiment, the signal analysis method comprises the following steps: An input signal function associated with a time domain is obtained. A window function is determined based on the input signal function via artificial intelligence circuitry or module. The artificial intelligence module comprises at least one computing parameter, wherein the window function is determined based on the at least one computing parameter. The input signal function and the window function are convolved, thereby generating a convolved signal.

The input signal is associated with a time domain input signal that is to be analyzed.

The input signal may be received and/or processed over a certain measurement time interval, thereby obtaining the input signal function. For example, the input signal may be digitized in order to obtain the input signal function. Thus, the input signal function may be a time- and/or amplitude-discrete function.

The convolved signal may be subject to further analysis and/or processing. In some embodiments, the convolved signal may be processed in order to analyze the input signal.

Generally speaking, the signal analysis method according to the present disclosure is based on the idea to reduce leakage effects by determining a window function and then calculating a convolution of the input signal function and the window function. However, the window function is not predetermined and fixed for all types of input signals, but rather is determined based on the at least one computing parameter and based on the input signal function by the artificial intelligence module. Thus, the window function is adapted appropriately with respect to the computing parameter and/or the input signal function.

In other words, the window function is automatically adapted to suit the particular input signal function that is associated with the particular input signal.

If the convolved signal is to be transformed to frequency domain, a suitable window function that minimizes leakage effects is automatically determined by the artificial intelligence module for the particular input signal that is to be analyzed.

In some embodiments, the artificial intelligence module comprises an artificial neural network that is trained to determine the window function based on the input signal function and based on at least one computing parameter.

The artificial neural network may be established as an autoencoder.

Therein, the term "computing parameter" is a collective term representing computational parameters that are employed by the artificial intelligence module in order to determine the window function.

In the case of the artificial intelligence module comprising the artificial neural network, the at least one computing parameter comprises weighting factors of the individual neurons of the artificial neural network.

According to one aspect of the present disclosure, the convolved signal is transformed via a mathematical transformation, thereby generating a transformed function. In other words, the convolved signal is further transformed such that the transformed function is obtained. The transformed function may be further processed and/or analyzed in order to obtain information about the input signal to be analyzed.

According to another aspect of the present disclosure, the mathematical transformation comprises a Fourier transformation. Thus, the transformed function is a function in frequency domain and can be further processed in order to analyze the frequency content of the input signal. As already mentioned above, the signal analysis method according to the disclosure reduces leakage effects occurring in the transformed function.

The at least one computing parameter may be adapted based on the transformed function and/or the input signal function. In other words, the window function is tuned to match the particular type of input signal to be analyzed. For adapting the at least one computing parameter, any suitable type of machine learning technique may be employed, for example any suitable type of deep learning technique.

Alternatively or additionally, the at least one computing parameter is adapted based on a user input. For example, the outputted signal, i.e. the convolved signal and/or the transformed function, may be analyzed by an operator (manually), and the operator may give feedback in order to adapt the at least one computing parameter. Therein, any type of supervised machine learning technique may be employed.

Alternatively, a processing circuit or module, for example a learning module, (automatically) analyses the outputted signal, i.e. the convolved signal and/or the transformed function, wherein a feedback is provided (automatically) in order to adapt the at least one computing parameter.

In an embodiment of the present disclosure, the transformed function and/or the input signal function is visualized on a display. Thus, the analysis of the transformed function and/or of the input signal by the operator is facilitated.

According to a further embodiment of the present disclosure, the artificial intelligence module is a machine learning module. In other words, the artificial intelligence module is trained to determine the window function by a suitable machine learning technique, for example a suitable deep learning technique.

Embodiments of the present disclosure further provide a signal analysis circuit or module. The signal analysis module comprises an input being configured to obtain an input signal function associated with an input signal. The signal analysis module further comprises an artificial intelligence module having at least one computing parameter, wherein the artificial intelligence module is configured to determine a window function based on the at least one computing parameter and based on the input signal function. The signal analysis module further comprises a convolution module being configured to compute a convolved signal by convolving the input signal function and the window function.

Therein and in the following, an embodiment where all modules are understood to be established as software modules is described. Accordingly, the term "the module is configured to ( . . . )" is understood to mean that the individual modules comprise program code or other means that are configured to perform the respective function described below. However, as is clear to a person skilled in the art, one or several functionalities of the modules or even complete modules may also be established in hardware.

Regarding the further properties and advantages of the signal analysis module, reference is made to the explanations given above regarding the signal analysis method, which also hold for the signal analysis module and vice versa.

The input of the signal analysis module may be configured to receive the input signal over a certain measurement time period.

The signal analysis module may comprise a processing circuit or module that is configured to process the input signal and to generate the input signal function based on the input signal.

Alternatively or additionally, the input signal function may be determined by another device or another module being separate from the signal analysis module.

In some embodiments, the signal analysis module is configured to perform the signal analysis method described above.

Generally, the signal analysis module may be part of a measurement instrument, such as an oscilloscope, a vector network analyzer, etc.

According to one aspect of the present disclosure, the signal analysis module further comprises a transformation circuit or module being configured to determine a transformed function via a mathematical transformation of the convolved signal. In other words, the convolved signal is further transformed such that the transformed function is obtained. The transformed function may be further processed and/or analyzed by the signal analysis module and/or another module in order to obtain information about the input signal to be analyzed.

According to another aspect of the present disclosure, the mathematical transformation comprises a Fourier transformation. Thus, the transformed function is a function in frequency domain and can be further processed in order to analyze the frequency content of the input signal. Thus, leakage effects occurring in the transformed function are reduced by the signal analysis module.

According to another aspect of the present disclosure, the signal analysis module comprises a learning module being configured to adapt the at least one computing parameter. For adapting the at least one computing parameter, the learning module may employ any suitable type of machine learning technique, for example any suitable type of deep learning technique.

In some embodiments, the learning module is configured to analyze the transformed function and/or the input signal function in order to adapt the at least one computing parameter. In other words, the learning module tunes the window function to match the particular type of input signal to be analyzed.

According to another aspect of the present disclosure, the learning module is configured to adapt the at least one computing parameter based on a user input. The signal outputted by the signal analysis module, i.e. the convolved signal and/or the transformed function, may be analyzed by an operator, and the operator may give feedback in order to adapt the at least one computing parameter. Therein, any type of supervised machine learning technique may be employed by the learning module.

Alternatively, a processing module, for example the learning module, (automatically) analyses the outputted signal, i.e. the convolved signal and/or the transformed function, wherein a feedback is provided (automatically) in order to adapt the at least one computing parameter.

The signal analysis module may further comprise a visualization module, wherein the visualization module is configured to visualize at least one of the transformed function and the input signal function. The visualization module may comprise a display and/or may be connected to a display that is configured to display the transformed function and/or the input signal function. This way, the analysis of the input signal function and/or the analysis of the transformed function by the operator is facilitated.

Embodiments of the present disclosure further provide a signal analysis method. The signal analysis method in some embodiments comprises the following steps: An input signal function is obtained. The input signal function is processed via an artificial intelligence module, thereby a convolved signal is determined. The artificial intelligence module provides at least one computing parameter, wherein the convolved signal is determined based on the at least one computing parameter.

Compared to the first embodiment of the signal analysis method described above, the convolution is not performed based on a generated window function, but is directly performed by the artificial intelligence module based on the at least one computing parameter.

Accordingly, the artificial intelligence module directly determines the convolved signal instead of determining a window function first that is convolved with the input signal function in order to obtain the convolved signal as in the case of the first embodiment described above.

The remaining explanations and advantages regarding the first embodiment described above also apply, possibly with suitable adaptations, to the second embodiment of the signal analysis method.

According to an aspect of the present disclosure, the convolved signal is transformed via a mathematical transformation, thereby generating a transformed function. In other words, the convolved signal is further transformed such that the transformed function is obtained. The transformed function may be further processed and/or analyzed in order to obtain information about the input signal to be analyzed.

In an embodiment of the present disclosure, the mathematical transformation comprises a Fourier transformation. Thus, the transformed function is a function in frequency domain and can be further processed in order to analyze the frequency content of the input signal. Thus, leakage effects occurring in the transformed function are reduced.

The at least one computing parameter may be adapted based on the transformed function and/or the input signal function. In other words, the artificial intelligence module is tuned to determine a convolved signal that matches the particular type of input signal to be analyzed.

For adapting the at least one computing parameter, any suitable type of machine learning technique may be employed, for example any suitable type of deep learning technique.

Embodiments of the present disclosure further provide a signal analysis method. In an embodiment, the signal analysis method comprises the following steps: An input signal function assigned to a certain measurement time interval is obtained. An analytic continuation of the input signal function is determined in a time region outside of the certain measurement time interval via an artificial intelligence module. The artificial intelligence module provides at least one computing parameter, wherein the analytic continuation is determined based on the at least one computing parameter.

Therein and in the following, the term "an analytic continuation is determined" is understood to comprise both the meaning "the analytic continuation is estimated" and "the analytic continuation is analytically calculated".

Compared to the second embodiment of the signal analysis method, the artificial intelligence module determines an analytic continuation of the input signal function outside of the certain measurement time interval based on the input signal function and based on the at least one computing parameter.

In some embodiments, the artificial intelligence module comprises an artificial neural network that is trained to determine the analytic continuation of the input signal function.

Leakage effects are reduced because the analytic continuation, for example if defined on a large time interval or even on the time interval from $-\infty$ to $+\infty$, better fulfills the condition of periodicity that is needed for the transformation into frequency domain.

According to an aspect of the present disclosure, the analytic continuation is transformed via a mathematical transformation, thereby generating a transformed function. In other words, the convolved signal is further transformed such that the transformed function is obtained. The transformed function may be further processed and/or analyzed in order to obtain information about the input signal to be analyzed.

According to another aspect of the present disclosure, the mathematical transformation comprises a Fourier transformation. Thus, the transformed function is a function in frequency domain and can be further processed in order to analyze the frequency content of the input signal. Thus, leakage effects occurring in the transformed function are reduced.

In some embodiments, the at least one computing parameter is adapted based on the transformed function and/or the input signal function. In other words, the artificial intelligence module is tuned to determine a convolved signal that matches the particular type of input signal to be analyzed.

For adapting the at least one computing parameter, any suitable type of machine learning technique may be employed, for example any suitable type of deep learning technique.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 2A-2D each show a diagram of an input signal in time domain or in frequency domain;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
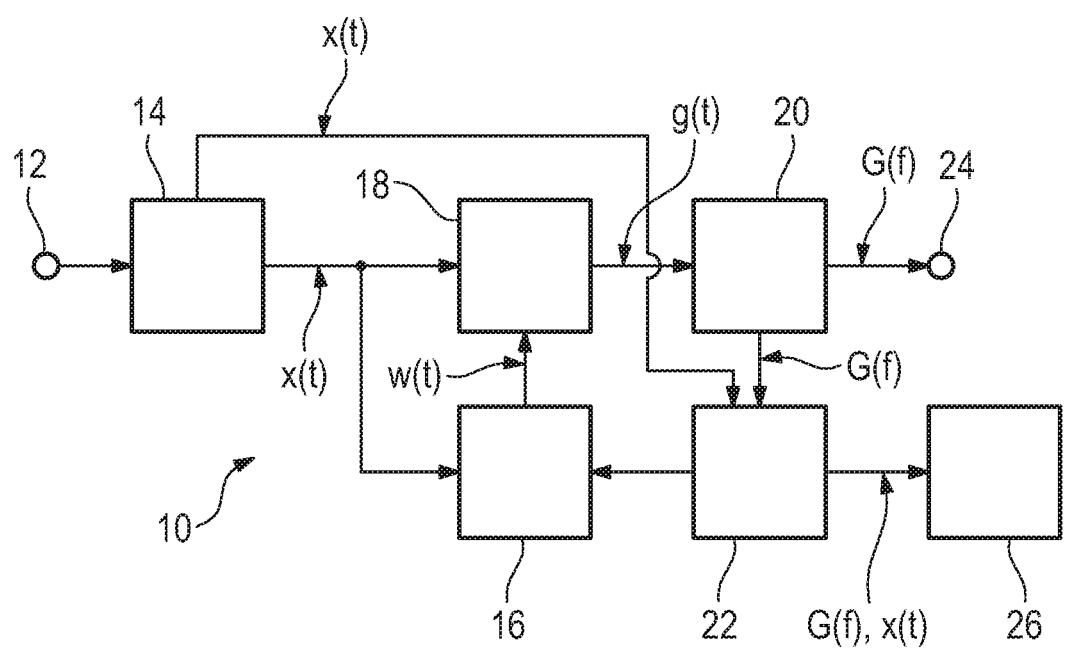
FIG. 1 schematically shows a block diagram of a representative signal analysis module according to a first embodiment the disclosure.

FIG. 1 schematically shows a block diagram of a signal analysis circuit or module 10. The analysis module 10 comprises an input 12, a processing circuit or module 14, an artificial intelligence circuit or module 16, a convolution circuit or module 18, a transformation circuit or module 20, a learning circuit or module 22, and an output 24.

Therein and in the following, a case where all modules are understood to be established as software modules will be described. Accordingly, the individual modules comprise program code, computer program product or other means that are configured to perform their respective function described below, when executed on one or more computing devices, such as a microprocessor, etc. Together, the program code and one or more computing device can form a special purpose computing device that implements that methodologies and technologies set forth herein. However, as is clear to a person skilled in the art, one or several functionalities of the modules or even complete modules may also be established in hardware.

The processing module 14, the artificial intelligence module 16 and the learning module 22 are each connected to the input 12 downstream of the input 12. Therein and in the following, the terms "upstream" and "downstream" are used to denote flow directions of data and/or signals within the signal analysis module 10, wherein the data and/or signals flow from the upstream component to the downstream component. Generally, the arrows shown in FIG. 1 indicate the flow direction of data and/or signals within the signal analysis module 10.

The convolution module 18 is interconnected between the processing module 14 and the transformation module 20, downstream of the processing module 14 and upstream of the transformation module 20. The transformation module 20 is interconnected between the convolution module 18 on one hand and the learning module 22 and the output 24 on the other hand, namely downstream of the convolution module 18 and upstream of the learning module 22 and the output 24. The artificial intelligence module 16 is further interconnected between the learning module 22 and the convolution module 18, namely downstream of the learning module 22 and upstream of the convolution module 18.

Generally speaking, the signal analysis module 10 is configured to receive a time domain input signal via the input 12 and to transform the time domain input signal to frequency domain, but with some modifications to the original input signal such that leakage effects are reduced. These leakage effects are illustrated, for example, in one or more of FIGS. 2A-2D.

FIG. 2A shows an input signal in time domain, i.e. an amplitude of the input signal is plotted against time t. In this particular example, the input signal has the form of a pure sinusoid. FIG. 2B shows the Fourier transform of the input signal of FIG. 2A, which has the form of a Delta-distribution.

However, this (idealized) result is only achieved when the input signal is periodic within a measurement interval over which the input signal is observed. Accordingly, the amplitude and the first derivative of the amplitude have to be the same at the left end and on the right end of the measurement interval.

FIG. 2C shows an example where the input signal is observed only over a finite measurement interval Δt, wherein the amplitude and the first derivative of the amplitude on the left end of the measurement interval are not the same as the amplitude and the first derivative on the right end of the measurement interval Δt.

FIG. 2D shows the Fourier transform, for example the fast Fourier transform (FFT), of the input signal under the above-mentioned circumstances of FIG. 2C. As can clearly be seen, the spectrum of the input signal is significantly broadened, i.e. leakage effects occur.

Figure 3:
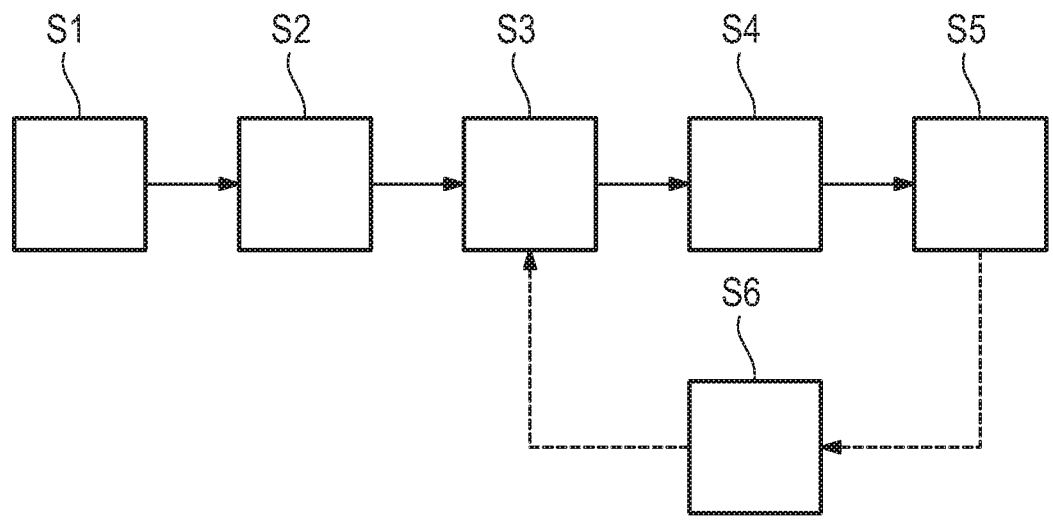
FIG. 3 shows a flow chart of a representative signal analysis method according to the disclosure.

In order to reduce these leakage effects, the signal analysis module 10 is configured to perform the signal analysis method that is described in the following with reference to FIG. 3.

First, the input signal is received via the input 12 (step S1). The input signal is then forwarded to the processing module 14 for further processing.

The processing module 14 processes the input signal and obtains an input signal function x(t) based on the input signal (step S2). Therein, the input signal is received or rather measured over a finite measurement time interval Δt, as is illustrated in FIG. 2C.

The processing module 14 may digitize the input signal, such that the input signal function x(t) is a time- and/or amplitude-discrete function, namely a digital signal. In other words, the processing module 14 may sample the input signal in order to obtain the input signal function x(t).

The obtained input signal function x(t) is forwarded to the artificial intelligence module 16, to the convolution module 18, and to the learning module 22.

In the shown embodiment according to FIG. 1, the artificial intelligence module 16 determines a window function w(t) based on the input signal function x(t) and based on at least one computing parameter of the artificial intelligence module (step S3).

Generally speaking, the artificial intelligence module 16 may employ machine learning techniques, for example deep learning techniques, and/or computational intelligence techniques in order to determine the window function w(t).

In some embodiments, the artificial intelligence module 16 comprises an artificial neural network that is trained to determine the window function w(t) based on the input signal function x(t) and based on at least one computing parameter.

Therein, the term "computing parameter" is a collective term representing computational parameters that are employed by the artificial intelligence module 16 in order to determine the window function w(t).

In the case of the artificial intelligence module 16 comprising the artificial neural network, the at least one computing parameter comprises weighting factors of the individual neurons of the artificial neural network.

Accordingly, the at least one computing parameter can be adapted by training the artificial intelligence module 16, for example the artificial neural network. Hence, the weighting factors may be adapted appropriately.

The generated window function w(t) is generated in such a way that the leakage effect for the input signal function x(t) convolved with the window function w(t) is reduced, for example minimized.

In other words, the artificial intelligence module 16 or rather the artificial neural network is trained to generate the window function w(t) such that the leakage effect is reduced, for example minimized.

The window function w(t) is forwarded to the convolution module 18.

The convolution module 18 convolves the input signal function x(t) and the window function w(t), such that a convolved signal g(t) is obtained (step S4).

Figure 4C:
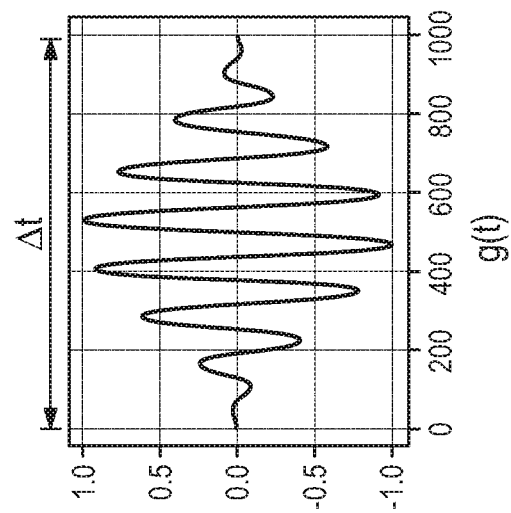
FIGS. 4A-4C show diagrams illustrating a convolution.
Figure 4B:
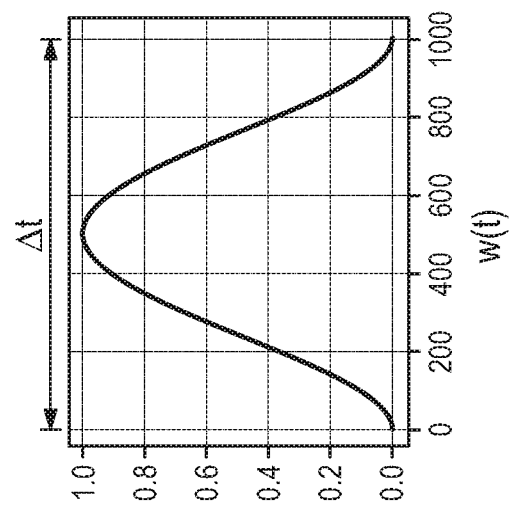
Figure 4A:
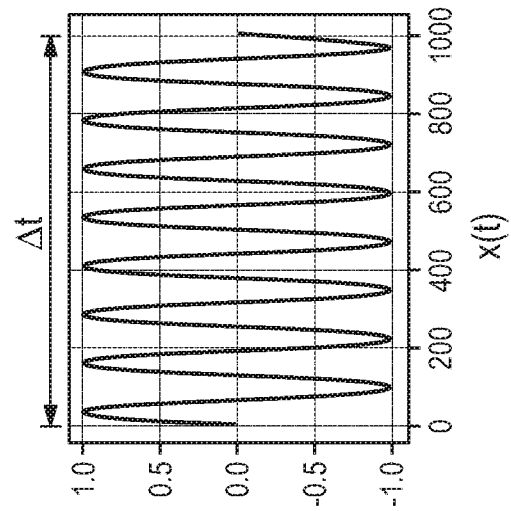

Step S4 is illustrated in FIGS. 4A-4C, which show the input signal function x(t) obtained by the processing module 14, an example for a window function w(t) obtained by the artificial intelligence module 16, and the resulting convolved function g(t) obtained by the convolution module 18.

Generally, the determined window function w(t) is zero outside of a certain time interval. In some embodiments, the determined window function is zero at the edges of the measurement time interval Δt.

Between the zeros of the window function w(t) at the edges of the measurement time interval Δt, the shape of the window function w(t) is determined by the artificial intelligence module 16. Thus, the actual shape of the window function w(t) may differ from the example shown in FIG. 4B.

Due to the general shape of the window function w(t) described above, the resulting convolved function g(t) also has zeros at the edges of the measurement time interval Δt. Moreover, the resulting convolved function g(t) is approximately periodic, for example periodic within the measurement time interval Δt.

The convolved signal g(t) is forwarded to the transformation module 20.

The transformation module 20 transforms the convolved signal g(t) from time domain to frequency domain via a mathematical transformation, thereby obtaining a transformed function G($f$) (step S5).

In other words, the transformation module 20 calculates the Fourier transform G(ω) of the convolved signal g(t), for example via a fast Fourier transform.

Figure 5A:
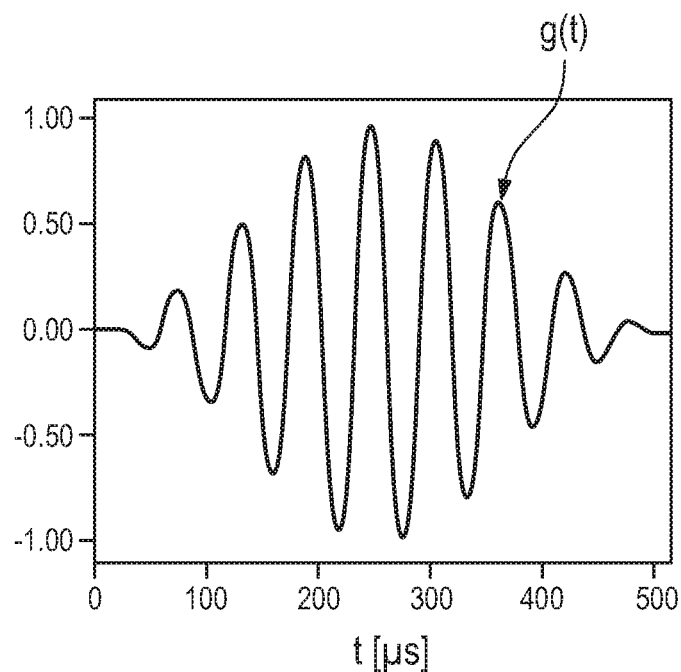
FIGS. 5A and 5B show a convolved signal in time domain and frequency domain, respectively.
Figure 5B:
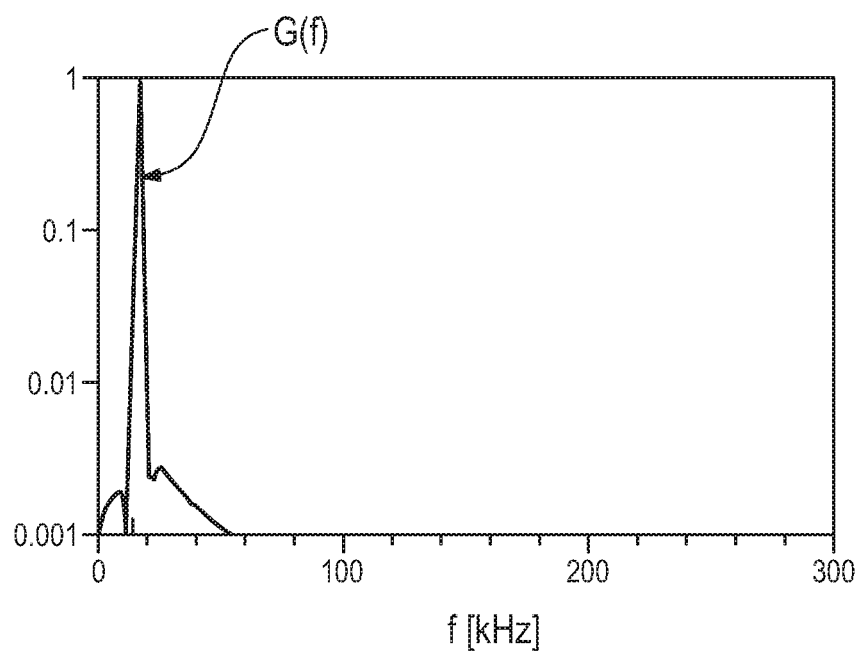

Step S5 is illustrated in FIGS. 5A and 5B, which show the convolved signal g(t) and the transformed function G($f$), respectively. As can clearly be seen from a comparison of FIGS. 2D and 5B, leakage effects are significantly reduced by the signal analysis method described above.

The transformed function G($f$) is forwarded to the output 24 and to the learning module 22. Thus, the output of the signal analysis module 10 is the transformed function G($f$).

The learning module 22 receives both the input signal function x(t) and the transformed function G(f), and adapts the at least one computing parameter of the artificial intelligence module 16 based on the input signal function x(t) and/or based on the transformed function G(ω) (step S6).

Thus, the learning module 22 may analyze the input signal function x(t) and/or the transformed function G(ω) and adapt the at least one computing parameter based on the analysis in order to enhance the quality of the determined window function w(t).

Hence, a servo loop is provided that encompasses the learning module 22 and the artificial intelligence module 16, as the learning module 22 provides a feedback to the artificial intelligence module 16 in order to adapt the at least one computing parameter, for example weighting factors.

Alternatively or additionally, the learning module 22 may adapt the at least one computing parameter based on user input.

For example, the output of the signal analysis module 10, i.e. the transformed function G(ω), may be analyzed by an operator (manually), and the operator may give feedback to the learning module 22 in order to adapt the at least one computing parameter.

In some embodiments, the transformed function G(ω) and/or the input signal function x(t) may be visualized via a visualization module 26, such that the operator can analyze the transformed function G(ω) and/or the input signal function x(t).

The visualization module 26 may comprise a display and/or may be connected to a (separately formed) display that is configured to display the transformed function G (ω) and/or the input signal function x(t), such that the analysis of the transformed function G(ω) and/or of the input signal function x(t) by the operator is facilitated.

Summarizing, the signal analysis module 10 and the signal analysis method described above provide the transformed function G(f) with significantly reduced leakage effects. Moreover, the signal analysis module 10 is configured to improve the quality of the outputted transformed function G(f) by adapting the at least one computing parameter of the artificial intelligence module 16 based on the input signal function x(t), based on the transformed function G(f), and/or based on user input.

Figure 6:
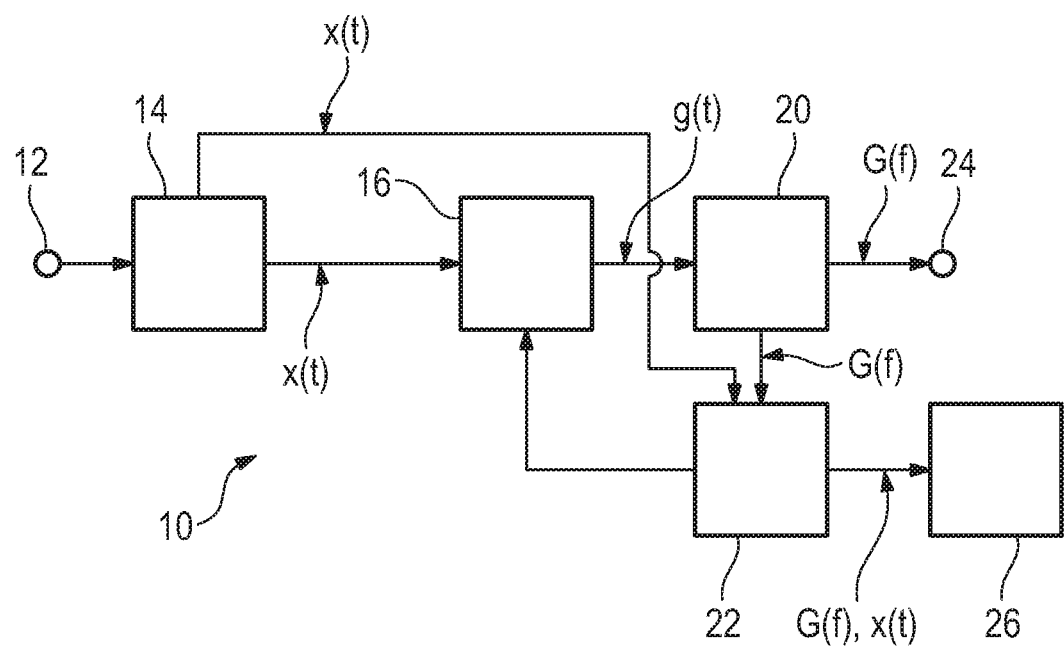
FIG. 6 schematically shows a block diagram of a representative signal analysis module according to a second embodiment the disclosure.

FIG. 6 shows a block diagram of a second embodiment of the signal analysis module 10. Therein and in the following, only the differences compared to the first embodiment of the signal analysis module 10 described above will be addressed, wherein the same reference numerals are used for modules with the same or like functionality.

Compared to the first embodiment of the signal analysis module 10, the convolution module 18 is replaced by the artificial intelligence module 16.

In the embodiment of FIG. 6, the artificial intelligence module 16 is configured to determine the convolved signal g(t) directly based on the input signal function x(t) and based on the at least one computing parameter of the artificial intelligence module, i.e. without determining a window function as in the first embodiment described above.

The signal analysis method performed by the signal analysis module 10 is adapted accordingly.

In some embodiments, the artificial intelligence module 16 comprises an artificial neural network that is trained to determine the convolved signal g(t) directly based on the input signal function x(t), for example without determining a window function previously.

The remaining explanations regarding the first embodiment described above also apply, possibly with suitable adaptations, to the second embodiment of the signal analysis module 10 and of the signal analysis method.

The convolved signal g(t) is directly determined by the artificial intelligence module 16.

Accordingly, a convolution module 18 is not required in this embodiment, as the convolved signal g(t) is directly determined by the artificial intelligence module 16.

Hence, the input signal function x(t) is processed via the artificial intelligence module 16, thereby determining the convolved signal g(t). Further, the artificial intelligence module 16 comprises at least one computing parameter. Moreover, the convolved signal g(t) is determined based on the at least one computing parameter.

Figure 7:
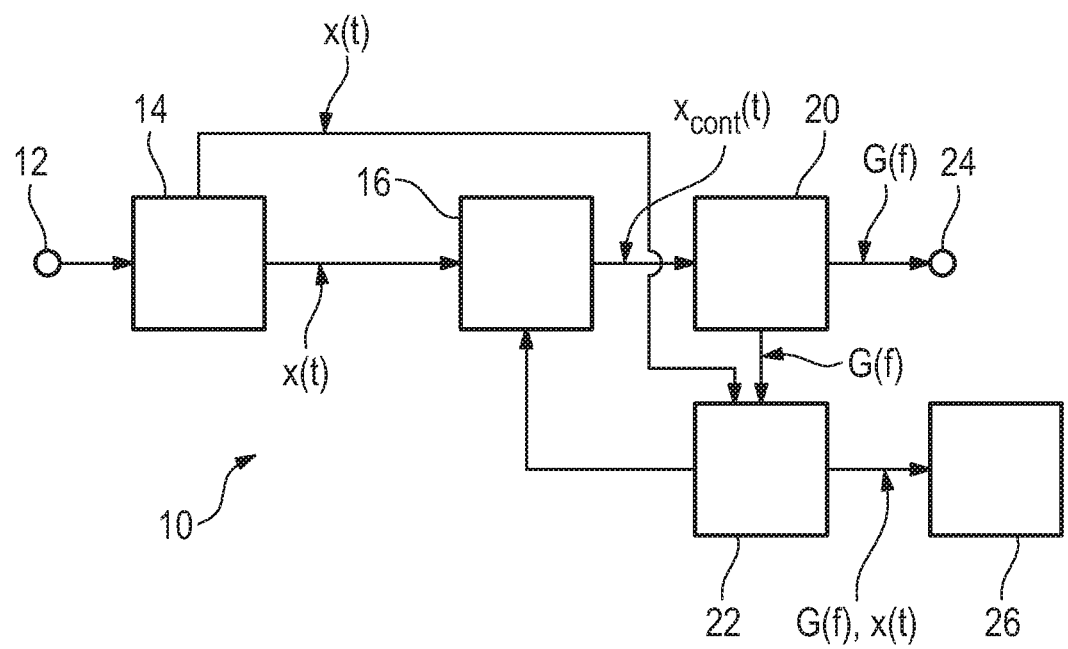
FIG. 7 schematically shows a block diagram of a representative signal analysis module according to a third embodiment the disclosure.

FIG. 7 shows a block diagram of a third embodiment of the signal analysis module 10. Therein and in the following, only the differences compared to the second embodiment of the signal analysis module 10 described above will be addressed, wherein the same reference numerals are used for modules with the same or like functionality.

Compared to the second embodiment of the signal analysis module 10 shown in FIG. 6, the artificial intelligence module 16 is configured to determine an analytic continuation $x_{cont}(t)$ of the input signal function x(t) outside of the measurement time interval Δt based on the input signal function x(t) and based on the at least one computing parameter.

The artificial intelligence module 16 may comprise an artificial neural network that is trained to determine the analytic continuation $x_{cont}(t)$ based on the input signal function x(t).

Generally, the analytic continuation $x_{cont}(t)$ is defined on a larger time interval than the input signal function, for example on a time interval from −∞ to +∞.

Accordingly, the transformation module 20 determines the transformed function G(f) based on the analytic continuation $x_{cont}(t)$ instead of the convolved function g(t).

Still, the leakage effects are reduced because the analytic continuation $x_{cont}(t)$, for example if defined on a large time interval or even on the time interval from −∞ to +∞, better fulfils the condition of periodicity.

The signal analysis method performed by the signal analysis module 10 is adapted accordingly.

The remaining explanations regarding the first and second embodiment described above also apply, possibly with suitable adaptations, to the third embodiment of the signal analysis module 10 and of the signal analysis method.

In some embodiment, the artificial intelligence module 16 determines the analytic continuation $x_{cont}(t)$ of the input signal function x(t) in a time region outside of the certain measurement time interval. The artificial intelligence module 16 comprises at least one computing parameter. The analytic continuation $x_{cont}(t)$ is determined based on the at least one computing parameter.

Generally, a signal in frequency domain can be analyzed with reduced leakage effects.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal analysis method, said method comprising:
    obtaining an input signal function associated with a time domain;
    determining a window function based on the input signal function via an artificial intelligence module, wherein said artificial intelligence module comprises at least one computing parameter, and wherein said window function is determined based on said at least one computing parameter; and
    convolving said input signal function and said window function, thereby generating a convolved signal,
    wherein said convolved signal is transformed via a mathematical transformation, thereby generating a transformed function,
    wherein said mathematical transformation comprises a Fourier transformation,
    wherein a shape of the window function is determined by the artificial intelligence module such that a leakage effect for the input signal function convolved with the window function is minimized.

2. The method of claim 1, wherein said at least one computing parameter is adapted based on at least one of said transformed function and said input signal function.

3. The method of claim 1, wherein said at least one computing parameter is adapted based on a user input.

4. The method of claim 1, wherein at least one of said transformed function and said input signal function is visualized on a display.

5. The method of claim 1, wherein said artificial intelligence module is a machine learning module.

6. A signal analyzer, comprising:
    an input being configured to obtain an input signal function associated with an input signal;
    artificial intelligence circuitry having at least one computing parameter, wherein the artificial intelligence module is configured to determine a window function based on said at least one computing parameter and based on said input signal function;
    convolution circuitry being configured to compute a convolved signal by convolving said input signal function and said window function; and
    transformation circuitry configured to determine a transformed function via a mathematical transformation of the convolved signal;
    wherein said mathematical transformation comprises a Fourier transformation,
    wherein the artificial intelligence circuitry is configured to determine a shape of the window function such that a leakage effect for the input signal function convolved with the window function is minimized.

7. The analyzer of claim 6, further comprising learning circuitry configured to adapt said at least one computing parameter.

8. The analyzer of claim 7, wherein said learning circuitry is configured to analyze said transformed function and/or said input signal function in order to adapt said at least one computing parameter.

9. The analyzer of claim 7, wherein said learning circuitry is configured to adapt said at least one computing parameter based on a user input.

10. The analyzer of claim 6, further comprising a visualization circuitry, wherein said visualization circuitry is configured to visualize at least one of said transformed function and said input signal function.

11. A signal analysis method, said method comprising:
    obtaining an input signal function;
    processing said input signal function via an artificial intelligence module, thereby determining a convolved signal, wherein said artificial intelligence module comprises at least one computing parameter, wherein said convolved signal is determined based on said at least one computing parameter, and wherein the artificial intelligence module directly determines the convolved signal based on the input signal function and based on the at least one computing parameter.

12. The method of claim 11, wherein said convolved signal is transformed via a mathematical transformation, thereby generating a transformed function.

13. The method of claim 12, wherein said mathematical transformation comprises a Fourier transformation.

14. The method of claim 12, wherein said at least one computing parameter is adapted based on said transformed function and/or said input signal function.

15. A signal analysis method, said method comprising:
obtaining an input signal function assigned to a certain measurement time interval;
determining an analytic continuation of said input signal function in a time region outside of said certain measurement time interval via an artificial intelligence module, wherein said artificial intelligence module comprises at least one computing parameter, and wherein said analytic continuation is determined based on said at least one computing parameter.

16. The method of claim 15, wherein said analytic continuation is transformed via a mathematical transformation, thereby generating a transformed function.

17. The method of claim 16, wherein said mathematical transformation comprises a Fourier transformation.

18. The method of claim 15, wherein said at least one computing parameter is adapted based on said transformed function and/or said input signal function.

\* \* \* \* \*